United States Patent [19]

Peacock

[11] Patent Number: 4,480,659

[45] Date of Patent: Nov. 6, 1984

[54] GATE STOP VALVE

[75] Inventor: Roy N. Peacock, Lafayette, Colo.

[73] Assignee: HPS Corporation, Boulder, Colo.

[21] Appl. No.: 508,003

[22] Filed: Jun. 27, 1983

Related U.S. Application Data

[63] Continuation-in-part of Ser. No. 318,459, Nov. 5, 1981, Pat. No. 4,408,634.

[51] Int. Cl.³ .............................................. F16K 3/02
[52] U.S. Cl. ............................. 137/630.12; 251/167; 251/197
[58] Field of Search ................... 137/630.12; 251/197, 251/167, 169, 204

[56] References Cited

U.S. PATENT DOCUMENTS

| 476,668 | 6/1892 | Miller | 251/167 |
| 2,850,260 | 9/1958 | Perazoue | 251/169 |
| 4,290,580 | 9/1981 | Balhouse | 251/197 X |
| 4,291,861 | 9/1981 | Faria | 251/197 X |

Primary Examiner—Harold W. Weakley

[57] ABSTRACT

A gate valve is disclosed having a casing with inlet and outlet apertures one of which has a valve seat. An actuator reciprocal transversely of the apertures is provided having two oppositely disposed faces. At least one plate member which serves as a valve head flanks at least one of the faces for cooperation with said valve seat. Cylindrical rotative means having a rectangular cross-section are positioned between the actuator member and the plate member for moving the plate member from an open to a closed/latched position as the actuator member is moved.

11 Claims, 12 Drawing Figures

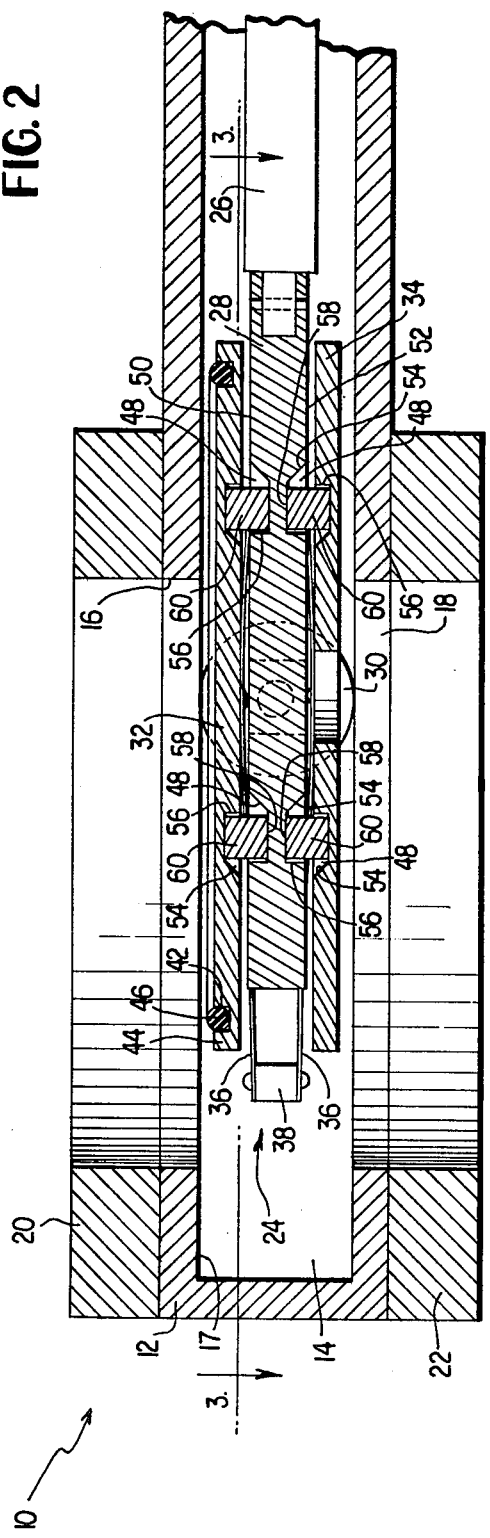
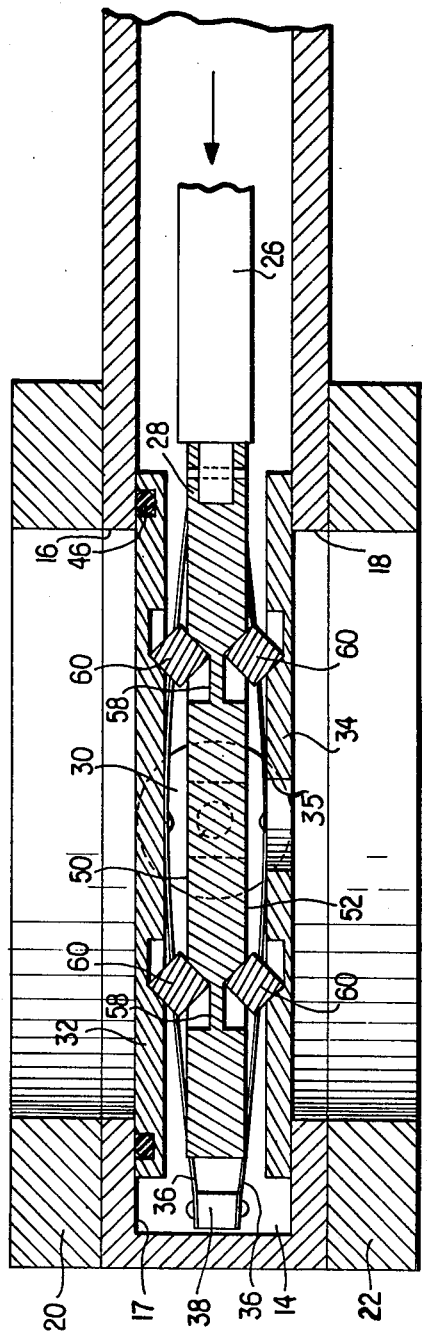
FIG. 2
FIG. 4

GATE STOP VALVE

RELATED APPLICATION

This application is a continuation-in-part of allowed U.S. application Ser. No. 318,459, filed Nov. 5, 1981, now U.S. Pat. No. 4,408,634.

BACKGROUND OF THE INVENTION AND OBJECTS

This invention relates to improvements in valves and more particularly, but not by way of limitation, to an improved gate type valve.

A gate valve of the type disclosed is particularly suitable for gas and vacuum pipe lines where a very tight seal is required. Heretofore, gate stop valves of this type employed various mechanisms for spreading two plates, superimposed on an actuator, into sealing engagement with one or more valve seats. Those mechanisms which employed linkages had the disadvantage that the bearings of the linkage were highly loaded which resulted in excessive wear. In addition, the linkage mechanism afforded too few connection points between the plates and the actuator which resulted in insufficient support. Such linkages also result in a thicker overall valve which for many applications is unacceptable. The mechanisms which employ wedge surfaces to spread the plates suffer from excessive wear unless lubricants can be used which, of course, limits the use of the gate valve to non-vacuum applications. Various mechanisms have also used balls which move in ramps in the plates and actuator. Those balls which are free and not firmly held between the plates and actuator do not always roll together often resulting in spaces developing between the balls with uneven sealing pressure being exerted on the plates. To ensure that the balls in such an environment move together and remain evenly spaced, retainer rings are often used around the balls. Because of the thickness of the retainer ring, the expansion of the plates can only be a small fraction of the thickness of the ball which is a major design hinderance. Some U.S. Letters Patents which disclose gate stop valve structures similar to that discussed above are U.S. Pat. Nos. 776,727 (Collar), 2,676,780 (Wheatly) and 3,368,792 (Schertler).

It is therefore the primary object of the present invention to provide a novel gate stop valve which overcomes the aforementioned disadvantages of similar valves in the prior art.

It is another object of the present invention to provide a gate stop valve utilizing square rollers with radiused corners which enable all rollers to be tripped at the same time resulting in an even and large outward expansion of the plates for a given roller dimension, i.e. edge height as compared to the diameter of a ball.

It is still another object of the invention to provide a gate stop valve whose use of square rollers results in a mechanism with a mechanical advantage that is favorable in that it becomes large when sealing force is required.

It is yet another object of the present invention to provide a gate stop valve that, when the rotation of the square rollers exceeds 45°, the mechanism goes over center and latches which prevents unlatching due to shock and the like.

It is a still further object of the present invention to provide a gate stop valve that is relatively narrow in thickness, is quiet acting and extremely efficient in its operation and sealing capabilities.

These and other features of my invention will be clearly understood from the following description of a preferred embodiment illustrated by way of example in the accompanying drawing, in which:

FIG. 2 is a side elevational view in cross-section of the valve of FIG. 1 in its semi-open position taken along the lines 2—2 thereof.

FIG. 4 is a side elevational view in cross-section of the valve of FIG. 1 in its closed position.

DETAILED DESCRIPTION OF THE INVENTION

Figure 1:
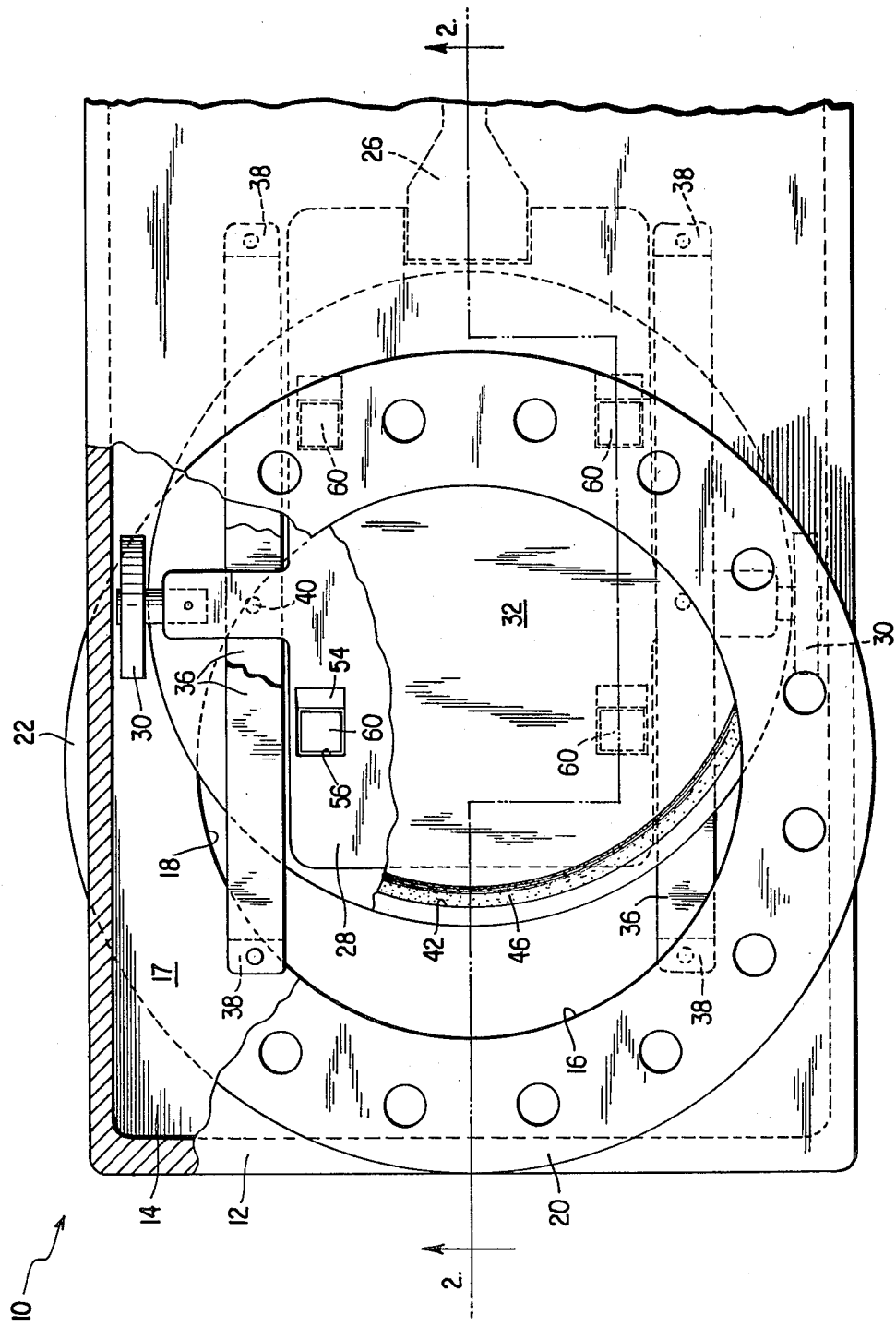
FIG. 1 is a plan view of one embodiment of the gate stop valve of the present invention with a portion broken away.

Referring now to FIGS. 1-4 where like characters of reference refer to like elements in each of the several views, one embodiment of the gate stop valve of the present invention is shown at 10. The stop valve has a valve body 12 which encloses a cavity 14 formed therein. The valve body 12 also has an inlet port 16 and an outlet port 18 through which the fluid to be controlled passes. The inlet port 16 has a surface 17 adjacent thereto which serves as a valve seat, it being recognized, of course, that the valve seat surface 17 could be adjacent the outlet port 18 or adjacent both the inlet and outlet ports if so desired. Adjacent the inlet port 16 and outlet port 18 are flanges 20, 22, respectively, for connecting the valve 10 to piping (not shown) in a well known manner.

Movable within the cavity 14 is a gate assembly 24 connected to a drive member 26 for imparting reciprocal movement to the assembly. The drive member 26 does not form a part of this invention but can be, for example, pneumatic, hydraulic, electromagnetic, or manually actuated in the aforesaid reciprocal manner with proper sealing means to prevent the escape of the fluid being controlled. The gate assembly 24 comprises an actuator plate 28 directly connected to the drive member 26. The actuator plate 28 has a wheel 30 rotatably mounted on opposite sides thereof which serve to center the gate assembly 24 in the body cavity 14 and guide it in its reciprocal travel.

A seal plate 32, which serves as a valve head, is provided adjacent one side of the actuator plate 28 and opposite the inlet port 16, valve seat 17 and a back-up plate 34 is provided adjacent the other side of the actuator plate 28 opposite the outlet port 16. The back-up plate 34 has a bore 35 therethrough to ensure the equalization of pressure on both sides of the plate. The seal plate 32 and back-up plate 34 are attached to the actuator plate 28 by means of leaf-type springs 36 which act to bias the plates 32,34 toward the actuator plate 28. The leaf springs 36 are grouped in two pairs and connected at their ends to blocks 38. One spring 36 of each pair is connected by a fastner 40, such as a rivet, to the seal plate 32 and one spring 36 of each pair is connected similarly to the back-up plate 34. The springs 36 thus hold the gate assembly 24 together and enable it to travel as a unit guided by wheels 30. The seal plate 32 is also provided with a circular groove 42 formed in the outer surface 44 thereof for receiving an O-ring sealing member 42.

Figure 3:
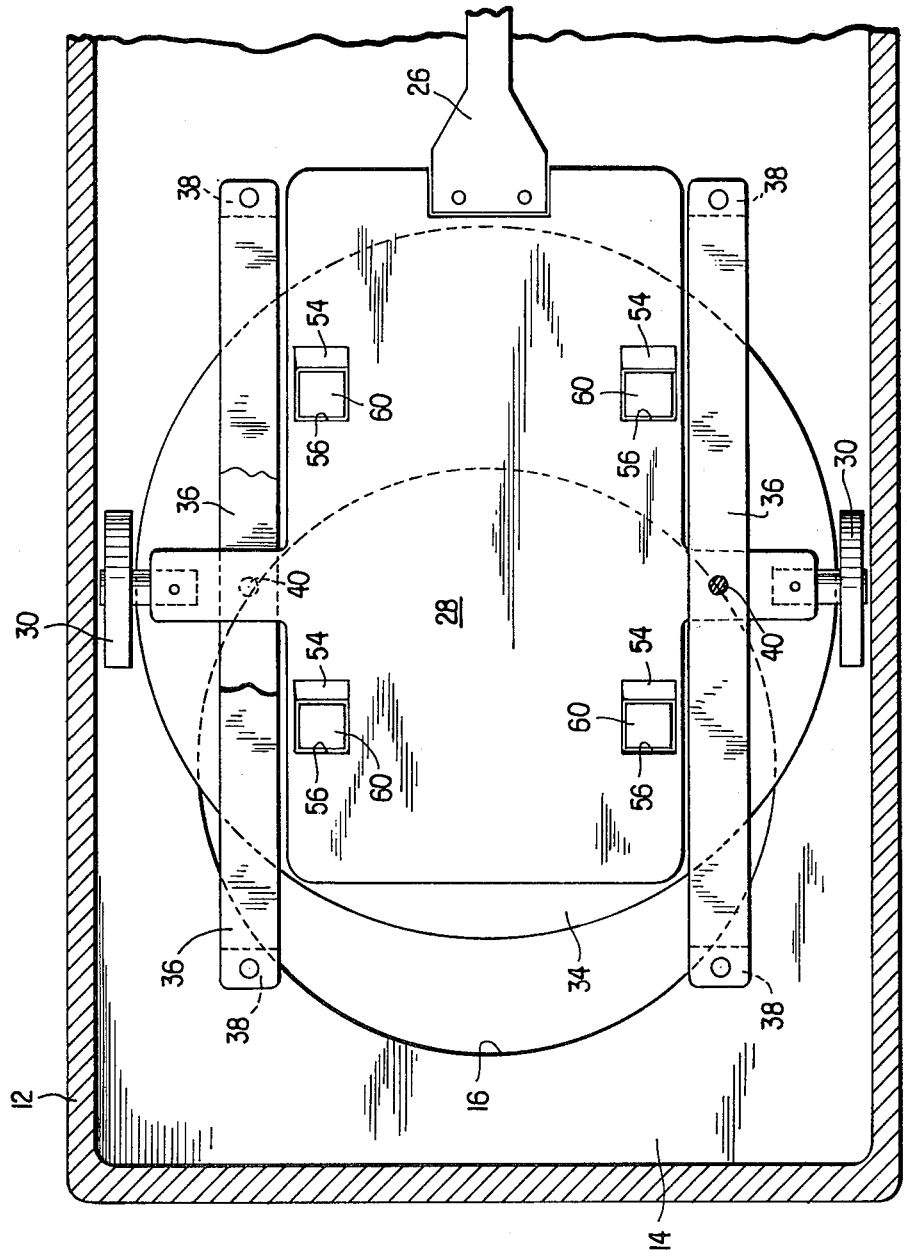
FIG. 3 is a cross-sectional view of the valve of FIG. 2 taken along the lines 3—3 thereof.

The actuator plate 28 as well as the seal plate 32 and back-up plate 34 have a plurality of substantially rectangular-shaped detents 48 formed in at least one surface thereof as can best be seen by referring to FIGS. 2 and 3. More specifically, the actuator plate 28 has four spaced-apart detents 48 formed on each of the opposite surfaces 50,52 thereof in a substantially square pattern, each detent 48 having a similarly positioned singular angled face 54 formed therein and a perpendicular face 56 opposite thereto. The seal plate 32 and back-up plate 34 also have detents 48 formed on one side thereof and correspond in placement to their opposite counterpart on the actuator plate 28, however, the location of the angled face 54 on the seal and back-up plate detents is opposite the angled face 54 on the actuator plate detents. Similarly the perpendicular faces 56 on corresponding detents 54 in the actuator plate 28 and seal and back-up plates 32,34, respectively, are located opposite each other. Rectangular-shaped rollers 60 are located in the recess formed between corresponding detents 48 and the flat sides thereof rest on the bottoms 58 of the detents 48 when the gate assembly 24 is in its non-actuated state, as shown in FIG. 2. However, as the drive member 26 moves gate assembly 24 from right to left as viewed in FIG. 4, the blocks 38 engage the bottom wall 62 of the cavity 14 thereby causing the seal plate 32 and back-up plate 34 to stop opposite the inlet and outlet ports 16, 18, respectively. As the drive member 26 continues to move from right to left as viewed in FIG. 4, the rollers 60 are caused to tip as they engage the corner 64 of the detents 48 where the angled face 54 and bottom wall 62 of each are joined and until the sides of the rollers 60 contact the angled faces 54 of the detents 48. In so tipping, the rollers 60 cause expansion of the gate assembly 24 since the length of the diagonal of the square is greater than its side by $(\sqrt{2}-1)$ times the length of the side. Further, if the rotation of the rollers 60 about a corner thereof exceeds 45 degrees, the roller 60 goes over center and the mechanism latches. Thus, in this latched mode, the force transmitted by the drive member 26 can be relaxed and the valve will remain closed. This is an important feature for, if the drive member 26 is driven by a pneumatic or hydraulic system and there is a failure in the system, the valve will continue to remain closed. The loss in expansion of the gate assembly 24, i.e., the amount of return of the seal plate 32 and back-up plate 34 toward the actuator plate 28 for an angle of say 50 degrees, would be negligible.

By utilizing the rectangular shaped rollers 60, all of the rollers are forced to tip at the same time resulting in an expansion motion which will be very nearly perpendicular to the plane of the gate thereby eliminating scuffing and damage to the O-ring seal and other contact surfaces. The expanded gate assembly 24 thus becomes rigidly locked between the ports. To open the valve, the motion of the drive member 26 is reversed which causes the rollers 60 to fall back into their positions wherein the flat surfaces thereof are adjacent the bottoms 58 of the detents 48 and seal plate 32 and back-up 34 collapse free of the valve body 12. Further, motion of the drive member 26 will withdraw the gate assembly 24 free of the inlet and outlet ports 16,18 respectively.

Should a pressure differential be present acting to retain seal plate 32 against valve seat 17 as the opening of the valve is attempted, the gate assembly 24 will collapse as aforementioned but it will be pulled toward the valve seat 17. Further, withdrawal motion of the drive member 26 will not cause re-expansion of the gate assembly 26 because the perpendicular faces 56 of the detents 48 are not effective in causing tipping of the rollers 60. The gate valve of FIGS. 1-4 is shown with the detents 48 not directly under the O-ring seal 46. This location of the detents 48 permits the seal plate 32 to flex slightly to act thereby to maintain the seal force when, for example, the rollers 60 are designed to pass over center into the latched condition. In addition, only four roller pairs are disclosed, when in fact for large valves, as many roller pairs may be used as required to provide uniform loading of the seal plate 32. Further, the rollers 60 are shown as though they had sharp corners, when in fact it is recommended the corners should be radiused to prevent excessive surface loading and consequent rapid wear.

Figure 5:
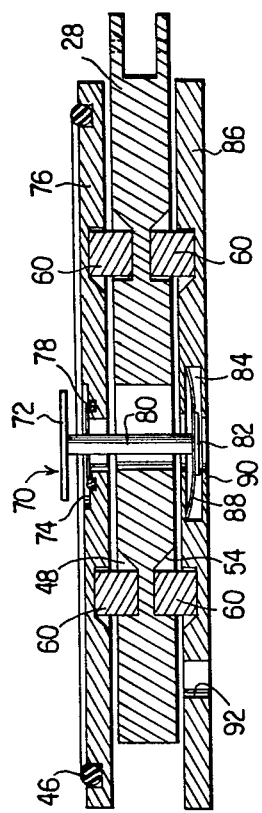
FIG. 5 is a side elevational view in cross-section of a second embodiment of the gate stop valve of the present invention.

Referring now to FIG. 5, a modification of the gate assembly 24 of FIGS. 1-4 is shown disclosing a means for opening the valve when a pressure differential tends to hold the valve closed. More specifically, the means comprises the use of a small valve or poppet 70 having a valve head 72 which engages a valve seat 74 formed in the seal plate 76 which is otherwise similar in construction and method of operation to seal plate 32 aforementioned. The valve seat 74 has an O-ring seal 78 to ensure a proper seal and the valve head 72 has a valve stem 80 terminating in a retainer ring 82. The valve stem 80 extends into a recess 84 formed in the back-up plate 86 and is centered therein by means of a Belleville spring 88. A lip 90 is also provided, the function of which will be described shortly. A recess 92 through the back-up plate 86 ensures equalization of pressure on both sides of the plate. In operation, when the seal plate 76 is expanded by rotation of rollers 60 in the manner aforestated, the valve head 72 is pulled against O-ring 78 by stem 80 and spring 88 to seal same. The spring 88 aids in ensuring sealing of the valve 70 independent of tolerance details. When the back-up plate 86 collapses, as the valve is being opened, the lip 90 engages the end of stem 80 to "slightly" force the valve head 72 away from the O-ring seal 78 thereby permitting the pressure across the seal plate 76 to equalize and enable the valve to open.

Figure 6:
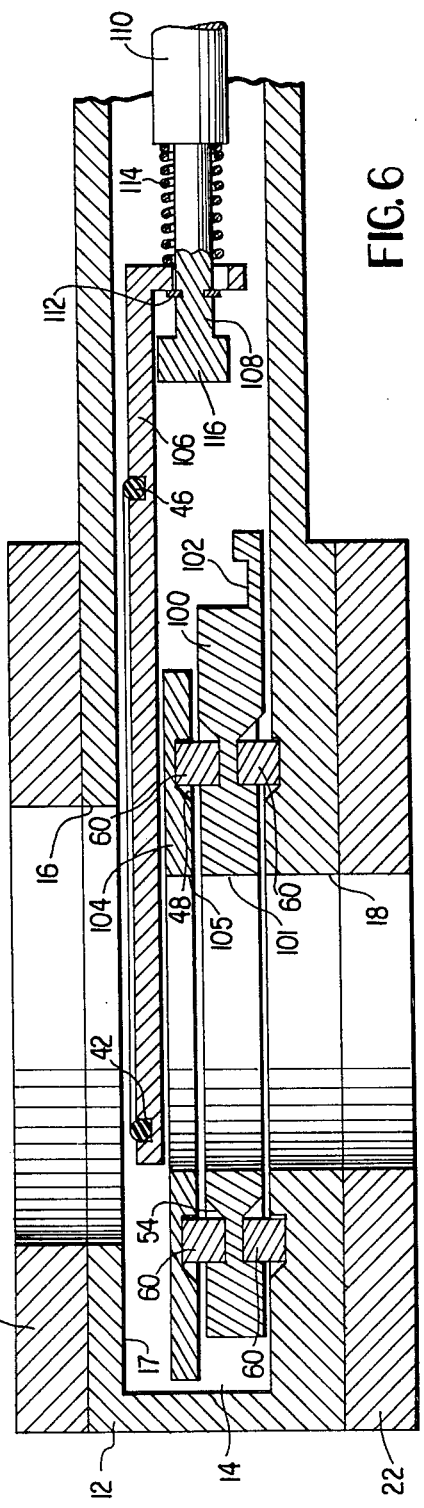
FIG. 6 is a cross-sectional view of a third embodiment of the gate stop valve of the present invention.
Figure 7:
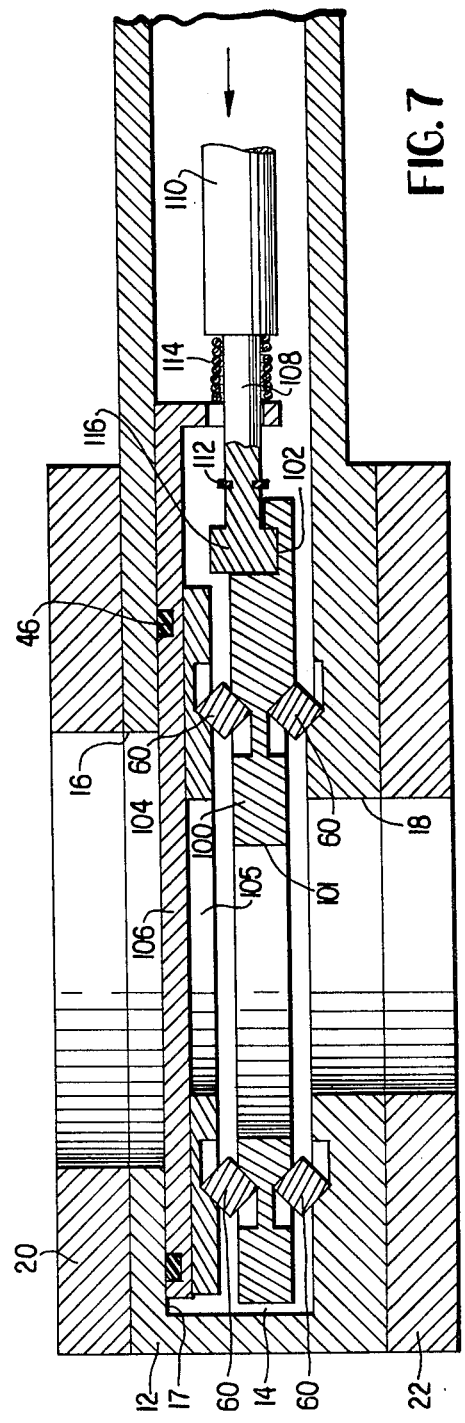
FIG. 7 is a cross-section view of the valve of FIG. 6 in its closed position.

Referring now to FIGS. 6 and 7, another embodiment of the gate stop valve of the present invention is disclosed wherein the detents 48(a) are formed in the valve body 12 itself. An actuator plate 100 having a through passage 101 is provided having a notch 102 in the end thereof, the function of which will be described later. The actuator plate 100 has standard detents 48 in the opposite faces thereof containing rollers 60. An intermediate plate 104 having a through passage 105 is provided which transmits the closure force exerted by the actuator plate 100 to a seal plate 106. The seal plate 106 is slidably connected to the stem 108 of the drive member 110 and is biased against a stop 112 by means of a spring 114. The stem 108 has a head 116 which has substantially the configuration of notch 102. As the drive member 110 is moved from right to left as viewed in FIGS. 6 and 7, the seal plate 106 is guided by wheels (not shown) to a position where it is centered opposite inlet port 16 and its travel ceases. The stem 108 and head 116 continues to over-travel, allowing the head 116 to strike surface 118 on actuator plate 100, thus tipping rollers 60 and moving intermediate plate 104 upward. The upward motion of intermediate plate 104 causes the O-ring seals 46 of seal plate 106 to engage the valve seal 17 closing the valve as shown in FIG. 7. As will be noted, the actuator plate 100 is also moved upward by the action of the rollers 60 to a position where the head 116 is engaged by the notch 102. Thus, when the valve is to be opened upon movement of the drive member 110 from left to right as viewed in FIGS. 6 and 7, the hooked end 116 causes the actuator plate 100 to follow its movement thereby unlatching the intermediate plate 104 permitting the seal plate 106 to be opened. A leaf spring arrangement (not shown for simplicity) similar to that disclosed in the embodiment of FIGS. 1-4 could be used to return the actuator plate 100 and intermediate plate 106 to the valve open position. As can be readily seen, the moving mass, i.e., the sealing plate 106 of this second embodiment of the valve, is considerably less than the gate assembly 24 of the first embodiment which is advantageous when high speed is desired and/or a low driving force is available.

It should be pointed out that the motion of the actuator plate could also be rotational about the center of a circular shaped seal plate as another way of utilizing the principles of this invention. A circular arrangement of the rollers between the actuator plate and the seal plate would be utilized to provide the required expansion in this suggested embodiment.

Figure 8:
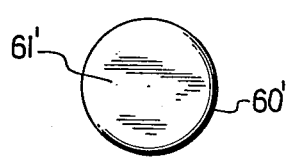
FIG. 8 is a plan view of an improved, cylindrical rotative means according to the invention.
Figure 9:
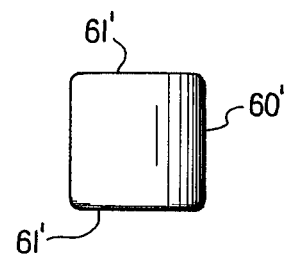
FIG. 9 is a side view of the rotative means of FIG. 9.

A further illustrative embodiment of roller 60 is shown in FIGS. 8 and 9 as 60' where the general configuration is cylindrical, the plan view being shown in FIG. 8 and the side view in FIG. 9. Generally, the height of the cylinder is similar but not necessarily equal to the diameter. Further, its bases may be slightly radiused as indicated at 60".

Figure 10:
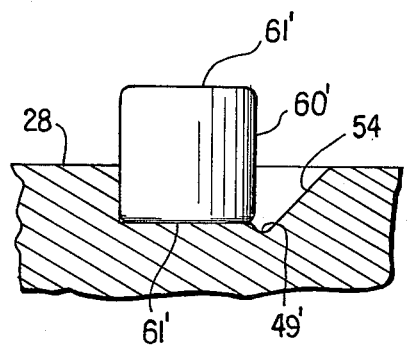
FIGS. 10 and 11 illustrate the rotative means of FIG. 8 in its unactuated and actuated position respectively.
Figure 11:
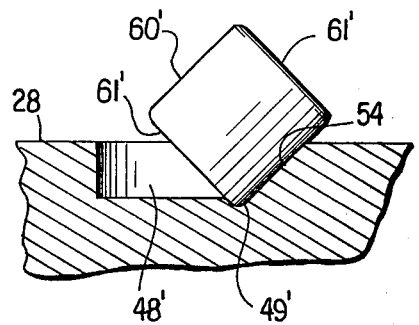

One of the rollers 60' is illustrated in its unactuated position in FIG. 10 and its actuated position in FIG. 11. As is indicated in FIG. 10, in the collapsed valve, the gate is supported on the cylindrical bases 61'. In the expanded gate, the load is born by a diagonal of the diametral plane in a manner exactly like the square roller 60 described hereinbefore.

Figure 12:
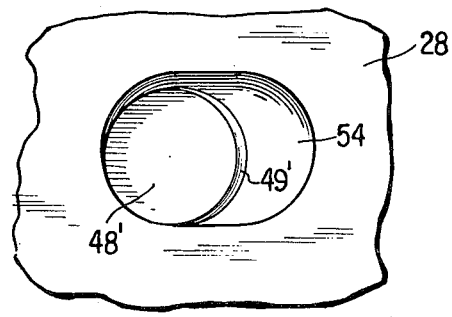
FIG. 12 is a perspective view of an illustrative detent for use with the rotative means of FIGS. 8 and 9.

The roller is easily fabricated due to its simple shape—that is, by simply turning it—yet it retains the square cross section employed in the present invention. The detent 48' of FIG. 12 may be milled using a cylindrical cutter—that is, end mill. As can be seen in FIGS. 10, 11 and 12, an indent 49' is formed in the detent, which may be formed by the aforesaid cutter or could be the result of use as the corner of roller 60' indents the detent. Generally, as indicated in FIG. 12, detent 48' may have a bathtub shape formed by inserting an end mill vertically and then withdrawing to leave an angle on side 54 slightly more than 45°.

In general, the square detents 60 described hereinbefore are generally made by methods such as stamping or spark erosion machining. Thus, these rollers tend to be more expensive to make than the cylindrical rollers 60'. In any event, in some valves, especially those where the expansion motion is in line with a linear gate travel, the square roller may be the best. For other valves, the cylindrical roller has advantages, particularly as related to production costs.

It is to be understood that the above detailed description of the various embodiments of the invention is provided by way of example only. Various details of design and construction may be modified without departing from the true spirit and scope of the invention as set forth in the appended claims.

I claim:

1. A gate valve comprising:
    (a) a casing having an inlet aperture and an outlet aperture at least one of which has a valve seat,
    (b) an actuator member reciprocal in said casing transversely of said apertures and having two oppositely disposed faces,
    (c) means for imparting reciprocation to said actuator member,
    (d) two plate members flanking said two oppositely disposed faces of said actuator member, at least one of said plate members being a valve head for cooperation with said valve seat, and
    (e) cylindrical rotative means having a rectangular cross-section, said rotative means positioned between said actuator member and said two plate members for moving said two plate members from an open to a closed and latched position as said actuator member is reciprocated.

2. A gate valve as set forth in claim 1 wherein said rotative means comprises a plurality of rotative members positioned between said plate members and said actuator member, each of said rotative members having a pair of opposite, circular flat surfaces where each surface is surrounded by a circumferential edge, one of each of said flat surfaces of said pair being in contact with said actuator member and said opposite flat surface of said pair being in contact with said plate member when said actuator member is in a first position whereby said valve head is out of engagement with said valve seat and a portion of one of said circumferential edges of one of said flat surfaces being in contact with said actuator member and a portion of said other circumferential edge of said opposite flat surface being in contact with said plate member when said actuator member is in a second position whereby said valve head is in latched engagement with said valve seat.

3. A gate valve as set forth in claim 1 further comprising spring means for biasing said plate members toward said actuator member.

4. A gate valve as set forth in claim 1 wherein said valve head has an O-ring on a face thereof for sealingly engaging said valve seat.

5. A gate valve as set forth in claim 1 further comprising valve means associated with said valve head for permitting said valve head to open when a pressure differential tends to hold said valve head closed, said valve means being actuated to its open position by said other plate member.

6. A gate valve as set forth in claim 1 wherein said rotative means is radiused at the edges thereof.

7. A gate valve comprising:
    (a) a casing having an inlet aperture and an outlet aperture at least one of which has a valve seat,
    (b) an actuator member reciprocal in said casing transversely of said apertures and having two oppositely disposed faces, (c) means for imparting reciprocation to said actuator member, (d) plate means flanking at least one of said faces and being a valve head for cooperation with said valve seat, and (e) cylindrical rotative means having a rectangular cross-section, said rotative means positioned between said actuator member and said plate means for moving said plate means into and out of engagement with said valve seat as said actuator member is reciprocated.

8. A gate valve as set forth in claim 7 further comprising means associated with said plate means for permitting said plate means to open when a pressure differential tends to hold said plate means closed.

9. A gate valve comprising:

(a) a casing having an inlet aperture and an outlet aperture one of which has a valve seat, (b) an actuator member reciprocal in said casing transversely of said apertures and having two oppositely disposed faces, (c) means for imparting reciprocation to said actuator member, (d) a first plate member positioned opposite said actuator member, (e) a second plate member positioned between said first plate member and said valve seat and being a valve head for cooperation with said valve seat, and (f) cylindrical rotative means having a rectangular cross-section, said rotative means positioned between said actuator member and said casing and said actuator member and said first plate for moving said first plate into engagement with said second plate and said second plate into engagement with said valve seat as said actuator member is reciprocated.

10. A gate valve as set forth in claim 9 wherein said second plate member is operatively connected to said reciprocation means and moved thereby to a position opposite said valve seat prior to said reciprocation means engaging said actuator member.

11. A gate valve as set forth in claim 9 wherein said rotative means comprises a plurality of rotative members positioned between said actuator member and said casing and said actuator member and said first plate member, each of said rotative members having at least one pair of opposite, circular flat surfaces where each surface is surrounded by a circumferential edge, one of each of said flat surfaces of said pair being in contact with said actuator member and said opposite flat surface of said pair being in contact with either said casing or said first plate member when said actuator is in a first position whereby said valve head is out of engagement with said valve seat and a portion of one of said circumferential edges of one of said flat surfaces being in contact with said actuator member and a portion of said other circumferential edge of said opposite flat surface being in contact with said casing and said first plate member when said actuator member is in a second position whereby said valve head is in latched engagement with said valve seat.

* * * * *